US012735096B2

(12) United States Patent
Otterbein

(10) Patent No.: US 12,735,096 B2
(45) Date of Patent: Sep. 15, 2026

(54) STEERING METHOD FOR OPERATING AN INDUSTRIAL TRUCK, AND INDUSTRIAL TRUCK

(71) Applicant: HUBTEX MASCHINENBAU GMBH & CO. KG, Fulda (DE)

(72) Inventor: Achim Edgar Otterbein, Grossenlueder (DE)

(73) Assignee: HUBTEX MASCHINENBAU GMBH & CO. KG, Fulda (DE)

(*) Notice: Subject to any disclaimer, the term of this patent is extended or adjusted under 35 U.S.C. 154(b) by 0 days.

(21) Appl. No.: 19/137,297

(22) PCT Filed: Nov. 24, 2023

(86) PCT No.: PCT/EP2023/082945
§ 371 (c)(1),
(2) Date: Jun. 10, 2025

(87) PCT Pub. No.: WO2024/126005
PCT Pub. Date: Jun. 20, 2024

(65) Prior Publication Data

US 2026/0200523 A1 Jul. 16, 2026

(30) Foreign Application Priority Data

Dec. 12, 2022 (DE) ..................... 10 2022 132 931.3

(51) Int. Cl.
*B62D 6/00* (2006.01)

(52) U.S. Cl.
CPC .................................. *B62D 6/001* (2013.01)

(58) Field of Classification Search
CPC ..................................................... B62D 6/001
See application file for complete search history.

(56) References Cited

U.S. PATENT DOCUMENTS

| | | | | |
|---|---|---|---|---|
| 7,464,785 | B2 | 12/2008 | Spark | |
| 2015/0191202 | A1 | 7/2015 | Otterbein | |
| 2016/0002016 | A1* | 1/2016 | Mcvicar | B66F 9/07568 254/2 R |
| 2020/0406965 | A1 | 12/2020 | Keller | |
| 2022/0194465 | A1* | 6/2022 | Keller | B62D 6/00 |

FOREIGN PATENT DOCUMENTS

| | | | |
|---|---|---|---|
| DE | 199 60 946 | A1 | 6/2001 |
| DE | 10 2004 005 762 | A1 | 9/2005 |
| DE | 10 2005 015 673 | A1 | 10/2006 |
| DE | 102 50 764 | C5 | 7/2009 |
| DE | 10 2012 105 831 | A1 | 1/2014 |
| DE | 10 2013 101 115 | A1 | 8/2014 |

(Continued)

*Primary Examiner* — Xiao En Mo
(74) *Attorney, Agent, or Firm* — Norman B. Thot

(57) ABSTRACT

A steering method for operating an industrial truck. The industrial truck has at least two front wheels, at least one rear wheel, and a steering angle transmitter which initiates a turning maneuver about a steering pole. The method includes entering an input value at the steering angle transmitter, and steering the at least two front wheels and/or the at least one rear wheel. The steering pole is moved on a steering line by a steering travel. The input value is linked to the steering travel via a steering ratio. The steering ratio is controlled.

20 Claims, 5 Drawing Sheets

(56) References Cited

FOREIGN PATENT DOCUMENTS

| | | | |
|---|---|---|---|
| DE | 10 2013 113 205 | A1 | 5/2015 |
| DE | 10 2019 109 466 | A1 | 10/2020 |
| EP | 1 657 140 | A2 | 5/2006 |
| EP | 2 956 350 | B1 | 12/2016 |
| WO | WO 01/70556 | A1 | 9/2001 |

* cited by examiner

STEERING METHOD FOR OPERATING AN INDUSTRIAL TRUCK, AND INDUSTRIAL TRUCK

CROSS REFERENCE TO PRIOR APPLICATIONS

This application is a U.S. National Phase application under 35 U.S.C. § 371 of International Application No. PCT/EP2023/082945, filed on Nov. 24, 2023 and which claims benefit to German Patent Application No. 10 2022 132 931.3, filed on Dec. 12, 2022. The International Application was published in German on Jun. 20, 2024 as WO 2024/126005 A1 under PCT Article 21(2).

FIELD

The present invention relates to a steering method for operating an industrial truck and to an industrial truck for carrying out such a steering method.

BACKGROUND

Such steering methods are known from the prior art in a multiplicity of different configurations. Single-axle steering methods, in which the wheels of only one axle are steered, multi-axle steering methods, in which the wheels of more than one axle are steered, as well as four-wheel steering methods, in which all the wheels can be steered, each wheel singly and individually, are in particular known.

In order to initiate a turning maneuver of an industrial truck, a turning radius is typically specified via a steering angle transmitter, such as a steering wheel or joystick. In response thereto, one or more steerable wheels of the industrial truck each rotates/rotate or steers/steer about an axis parallel to a vertical axis of the industrial truck, with the result that the steered wheels are no longer arranged parallel to a longitudinal direction or transverse direction of the industrial truck. A distinction can here be made between actively steerable wheels, namely, wheels which have a steering gear or a steering drive for turning or steering the respective wheel or a wheel suspension system, and passively steerable wheels, namely, those which are not actuated by a motor for steering, but are, for example, designed as a trailing roller. The industrial truck performs a turning maneuver about a steering pole as a result of the position of the steered wheels at an angle with respect to the longitudinal or transverse direction of the industrial truck.

The steering pole is the point at which straight lines which lie orthogonally with respect to the wheels of the industrial truck and coincide with a respective axis of rotation can meet. The straight lines of all steered wheels advantageously meet at a common steering pole, with the result that slipping or rubbing can be substantially avoided.

The steering pole is typically shifted along a steering line when a turning maneuver is initiated. For example, during travel straight ahead, all the wheels of the industrial truck are typically parallel to each other. The steering pole lies at infinity in this case. If a turning maneuver is initiated by an actuation of a steering angle transmitter, the steering pole moves along the steering line from infinity toward the industrial truck. If one or more wheels of the industrial truck do not steer when the turning maneuver is initiated, i.e., when one or more wheels of the industrial truck are not rotated about an axis parallel to the vertical axis when the turning maneuver is initiated, the steering line becomes a straight line which intersects the center point of the non-steered wheel.

It should be clear that the vertical axis (which is also called the z-axis), a longitudinal axis (which is also called a front-rear axis or x-axis), and a transverse axis of the industrial truck (which is also called the y-axis) are orthogonal with respect to each other and typically intersect in the vehicle center. The longitudinal axis of the industrial truck intersects the truck center point of the industrial truck and is typically arranged along the direction in which the industrial truck is operated in the main direction of travel. A transverse axis of the industrial truck intersects the longitudinal axis orthogonally in the vehicle center point and typically lies in the plane along which the industrial truck can be moved perpendicularly or laterally with respect to the main direction of travel, for example, in the case of a lateral displacement of the industrial truck.

The steering pole is typically shifted by an input on the steering angle transmitter. An input on the steering angle transmitter can, for example, be a rotation of the steering wheel by a certain angle or a movement on a joystick by a certain travel. The input angle or travel corresponds to an input value which is further processed and converted into a corresponding shift of the steering pole on the steering line by a certain steering travel.

The conversion of the input value is usually linked via a steering ratio to the steering travel. It can generally be stated that the steering ratio behaves like a factor, the multiplication of which by the input value provides the steering travel.

EP 2 956 350 B1 describes a three-wheel industrial truck and a steering method applicable thereto in which, in a longitudinal travel operation (also called retractable truck operation), two front wheels of the industrial truck are non-steered or are permanently arranged parallel to the longitudinal axis for initiating a turning maneuver, and the steering of the truck takes place by turning a rear wheel of the industrial truck. The rear wheel (depending on the adjustment of the steering angle transmitter, in particular proportionally to an adjustment angle of the steering transmitter) can here be oriented obliquely with respect to the longitudinal axis, with the result that the industrial truck performs a rotation about a steering pole which is arranged on a steering line which extends as a straight line through the two front wheels.

It has been shown that the steering methods known from the prior art have disadvantages. It has been shown, for example, that different situations in the operation of the industrial truck place different demands on the operator. During long travel straight ahead, for example, an operator must concentrate primarily on the situation in front of the vehicle without the need for high-precision steering of the industrial truck. The operator can here roughly guide the steering transmitter. In contrast thereto, other situations require a significantly higher steering effort. It is conceivable, for example, to here pick up or unload a load in a narrow rack aisle. The operator must operate the steering transmitter particularly intensively in such a situation, which can be relatively demanding.

SUMMARY

An aspect of the present invention is to provide a steering method for operating an industrial truck, and an industrial truck, which do not have the disadvantages of the prior art and which make it possible to design the driving and steering behavior of the industrial truck to be particularly comfortable and optimum for the operator.

In an embodiment, the present invention provides a steering method for operating an industrial truck. The industrial truck comprises at least two front wheels, at least one rear wheel, and a steering angle transmitter which is configured to initiate a turning maneuver about a steering pole. The method comprises entering an input value at the steering angle transmitter, and steering at least one of the at least two front wheels and the at least one rear wheel. The steering pole is moved on a steering line by a steering travel. The input value is linked to the steering travel via a steering ratio. The steering ratio is controlled.

BRIEF DESCRIPTION OF THE DRAWINGS

The present invention is described in greater detail below on the basis of embodiments and of the drawings in which.

DETAILED DESCRIPTION

Figure 1:
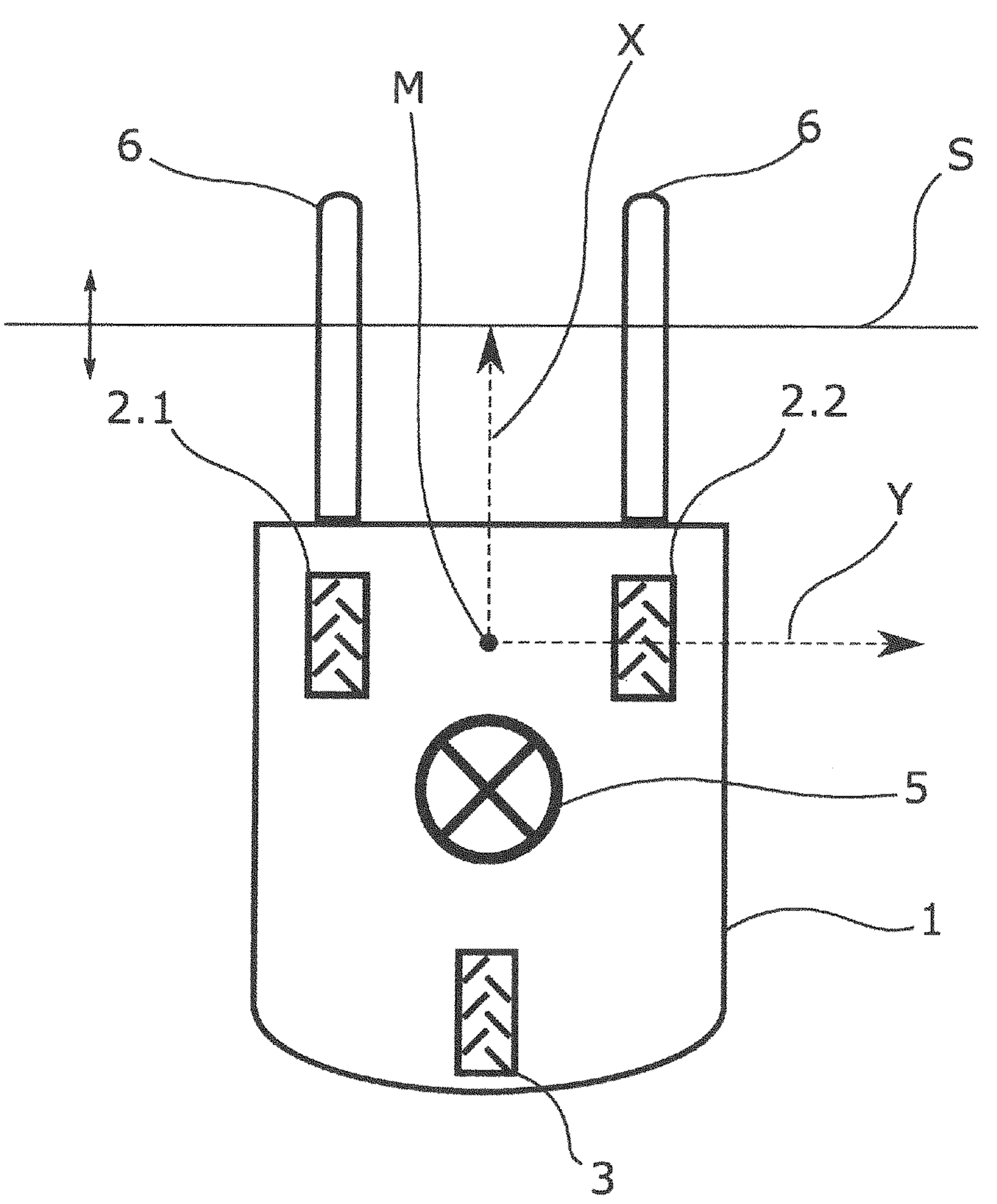
FIG. 1 shows a schematic view of an industrial truck according to one exemplary embodiment of the present invention during travel straight ahead in a longitudinal travel operation.

The present invention provides a steering method which is particularly suitable for industrial trucks which, as viewed in the orientation of longitudinal travel, have at least two front wheels and at least one rear wheel. It is also conceivable that the industrial truck has more than two front wheels and one rear wheel, for example, two front wheels and two rear wheels. It is also conceivable that the industrial truck has three or more front and/or rear wheels and/or one, two or more wheels on further axes which are arranged in front of the front wheels, between the front and rear wheels and/or behind the rear wheels, relative to the longitudinal axis of the industrial truck. The present industrial truck can in particular be designed as a forklift truck.

A front wheel within the meaning of the present invention can in particular be arranged on that side region, in particular a front region of the industrial truck, which faces a load-supporting device of the industrial truck. A rear wheel within the meaning of the present invention can be arranged on that region of the industrial truck which faces away from a load support. If the load support is provided approximately in the center of the industrial truck, a front wheel can in particular be understood to be the wheel arranged at the front or leading in the main direction of travel of the industrial truck, and the rear wheel can correspondingly be understood to be the wheel arranged at the rear or trailing in the main direction of travel of the industrial truck.

In order to move the industrial truck, at least one of the front and/or rear wheels is driven, in particular in the circumferential direction. The travel drive of the wheels can be designed independently of each other; each driven wheel can, for example, have its own travel drive motor which can in particular be controlled independently of the other travel drives. The travel drive can be designed as an electric motor. It is also conceivable, however, that the travel drive has a combustion engine, a pneumatic motor, or a hydraulic motor. Each travel drive can furthermore be individually actuable in a manner dependent on a steering angle of the respective wheel and/or the industrial truck. Only the two front wheels can, for example, be driven for the movement of the industrial truck.

It is also provided that all wheels of the industrial truck are designed to be steerable. It is conceivable that the industrial truck has actively steerable wheels or steerable wheels driven for steering purposes and passively steerable wheels or non-driven wheels for steering purposes, such as a trailing roller. The steerable wheels driven for steering purposes can have a steering gear or can each have their own steering drive such as, for example, a steering drive motor for rotating the respective wheel about its wheel vertical axis parallel to the vertical axis of the industrial truck. The steering drives can in particular be actuated independently of each other with the result that each steerable wheel provided with a steering drive can be steered individually. For the sake of improved clarity, reference is made in the present case only to the "wheel" as a steerable component. It can self-evidently also be provided that an entire wheel suspension system with one or more individual wheels is rotated or steered about a vertical axis of the wheel suspension system via a steering gear or steering drive.

In order to initiate a turning maneuver about the steering pole, it is provided that the steering angle transmitter is actuated. The steering angle transmitter can, for example, be a steering wheel, a joystick, a slide controller, a rotary controller, or a pedal arrangement. It is also conceivable, however, that the steering angle transmitter is a sensor for automatically initiating a turning maneuver, for example, along a predetermined path, or a computer which is configured for initiating a preprogrammed or situation-dependent turning maneuver. Upon the input of an input value at the steering angle transmitter, the at least two front wheels and/or the at least one rear wheel are steered, i.e., the at least two front wheels and/or the at least one rear wheel are each rotated about an axis parallel to the vertical axis of the industrial truck. This causes the steering pole to be shifted on the steering line by a steering value. Both the at least two front wheels and the at least one rear wheel can, for example, be steered for initiating a turning maneuver.

A vertical axis of the industrial truck within the meaning of the present invention intersects a vehicle center and is arranged orthogonally with respect to the longitudinal axis and orthogonally with respect to the transverse axis. The vertical axis is also arranged orthogonally with respect to the plane in which the industrial truck is provided for transporting a load. A longitudinal axis of the industrial truck within the meaning of the present invention intersects the vehicle center of the industrial truck and is arranged along the direction in which the industrial truck is moved for loading or unloading a load, and is located in the plane along which the industrial truck is provided for conveying a load. A transverse axis of the industrial truck within the meaning of the present invention is arranged orthogonally with respect to the longitudinal axis and orthogonally with respect to the vertical axis and intersects the longitudinal axis in the vehicle center.

Both the at least two front wheels and the at least one rear wheel can, for example, be steered for initiating a turning maneuver. It is provided that all wheels of the industrial truck are designed to be steerable. It is conceivable that the industrial truck has steerable wheels driven for steering and wheels non-driven for steering. The steerable wheels driven for steering can each have a separate steering drive motor for rotating the respective wheel in each case about a wheel vertical axis parallel to the vertical axis of the industrial truck. The steering drives can in particular be actuated independently of each other with the result that each steerable wheel provided with a steering drive can be steered individually. When a turning maneuver from travel straight ahead is initiated, the steering pole is moved along a steering curve coming from infinity toward the industrial truck by the steering travel which is proportional to the input of the input value at the steering angle transmitter.

The steering travel is calculated from the input value which is multiplied by the steering ratio. The steering ratio thus links the steering travel to the input value. The present invention provides that the steering ratio is controlled dynamically, in particular partially and/or fully automatically. This makes it possible in an advantageous way to adapt the steering behavior of the industrial truck to the present operating situation of the industrial truck. Dynamically controlled in the sense of the present invention means that the steering ratio can be adapted during operation of the industrial truck and can in particular be adapted in a manner which is dependent on predefined criteria in operation of the industrial truck. Dynamic and/or partially or fully automatic control or transmission in a manner dependent on, in very general terms, "external conditions or circumstances" can be particularly advantageous. The steering ratio can, for example, be effected in a manner which is dependent on external environmental conditions such as, for example, a current weight of a loaded load, a center of gravity of the load, a tilt angle of the industrial truck, a turning space, a traveling speed, a track surface, an intensity, in particular speed of the movement of the steering angle transmitter, and/or other circumstances affecting the steering and steerability of the industrial truck. For an automatic control, detection devices for detecting the external environment and environmental conditions can be provided on the industrial truck, for example, a distance sensor and/or an acceleration sensor, which can be monitored by a control device and thus taken into account for controlling the steering line. The steering ratio can also vary over the whole course of the steering line. For example, in the case of steering from travel straight ahead and a steering pole that is correspondingly far away from the industrial truck, a low ratio can be achieved, for example, when turning the steering wheel from a straight line to an angle of +/−10°, whereas, in the case of steering from a steered position, for example, when the steering wheel is turned by up to an angle of more than 10°, a higher ratio is achieved, with the result that the wheels can be steered faster.

Advantageous embodiments and developments of the present invention can be gathered from the claims and from the description with reference to the drawings.

In an embodiment, the present invention provides that the steering ratio can, for example, be controlled in a manner dependent on an operating parameter of the industrial truck. An operating parameter of the industrial truck within the meaning of the present invention can be an external influence. It is conceivable, for example, that the external influence is brought about by the operation of the industrial truck. It is also conceivable, however, that the external influence is brought about by environmental conditions. An operating parameter of the industrial truck within the meaning of the present invention may alternatively or additionally also be a parameter which is due to the structure of the industrial truck. It is thus in particular advantageously possible to control the steering ratio in a (partially) automated manner. An operator need not worry about setting the steering ratio. This greatly simplifies the operation of the industrial truck.

The operating parameter can, for example, comprise a vehicle speed for this purpose. A vehicle speed within the meaning of the present invention is the speed at which the industrial truck is moved and/or is to be moved. It is conceivable, for example, that the vehicle speed is the current speed of the industrial truck along the plane in which the industrial truck is provided for transporting a load. It is also conceivable, however, that the vehicle speed is a target speed at which an operator intends to drive the industrial truck along the plane in which the industrial truck is provided for transporting a load. It is conceivable to this end that the driving speed is linked to a speed setpoint value which is specified by an operator of the industrial truck, for example, by actuating an accelerator pedal. It can, for example, be provided that the steering ratio is controlled so that the steering ratio is high at low driving speeds, and that the steering ratio is low at high driving speeds. This makes it possible in an advantageous way that, at low travel speeds, for example, for turning, the steering angle transmitter only needs to be moved slightly. This also advantageously prevents unintentional movements on the steering angle transmitter from leading to unwanted steering reactions when the industrial truck is traveling at high speed. It is conceivable that the steering ratio is adjusted in a linear manner with the travel speed. It is also conceivable, however, that the steering ratio is adjusted in a stepped manner with the travel speed.

In an embodiment, the present invention provides that the industrial truck can, for example, be operated in a longitudinal travel operation and/or in a transverse travel operation. In the longitudinal travel operation, the industrial truck is intended to travel straight ahead along the longitudinal axis of the industrial truck. In the transverse travel operation, the industrial truck is intended to travel straight ahead along the transverse axis of the industrial truck. In the longitudinal travel operation, the operating parameter comprises a transverse spacing of the steering pole from the longitudinal axis. In the transverse travel operation, the operating parameter comprises a longitudinal spacing of the steering pole from the transverse axis. The steering ratio is in particular controlled so that the steering ratio in the longitudinal travel operation is here higher at small transverse spacings than at great transverse spacings, and that the steering ratio in the transverse travel operation is here higher at small longitudinal spacings than at great longitudinal spacings. In other words, a further input at the steering angle transmitter by the operator during tight turning maneuvers has a greater influence on the turning maneuver than an input at the steering angle transmitter by the operator during turning maneuvers with a large turning radius or during travel straight ahead. It is conceivable that the steering ratio is adjusted in a linear manner with the transverse or longitudinal spacing. It is also conceivable, however, that the steering ratio is adjusted in a stepped manner with the transverse or longitudinal spacing.

The operating parameter can, for example, comprise a condition of the track on which the industrial truck is moved. It is in particular provided that the operating parameter comprises flatness deviations of the track. Flatness deviations of the track within the meaning of the present invention include a depth or a height of unevennesses of the track, and are therefore also called unevennesses. It can, for example, be provided that the steering ratio is controlled so that, in the case of pronounced flatness deviations and/or a high number of flatness deviations, the steering ratio is lower than in the case of less pronounced flatness deviations and/or a lower number of flatness deviations. This makes it possible in an advantageous manner that, in the case of poor tracks, an accidental snatching of the steering angle transmitter does not lead to pronounced, unwanted steering movements of the industrial truck. It is conceivable that the magnitude and/or number of flatness deviations is detected by a vibration sensor of the industrial truck. It can also be provided that the operating parameter comprises expected or already occurring swaying or shaking of the industrial truck, in particular in the case of or due to an uneven track condition. "Expected" is in particular to be understood in the present case so that the industrial truck can comprise a detection device, in particular optical sensors, which detects, in particular scans, the ground surface which is distinctive spatially in front of the industrial truck in the direction of travel, and that the resulting information can be used to determine operating parameters for the swaying or shaking of the industrial truck that can be expected when driving over the uneven ground. The steering line can be optimally controlled based on this information, in particular in order to prevent the industrial truck from slipping or rubbing with respect to the ground and/or the load from slipping with respect to the industrial truck when traveling around turns. Anticipatory travel can thus be enabled.

The present invention provides that the operating parameter can, for example, comprise the geometry and/or the center of gravity of a loaded load. The geometry of the load is in particular to be understood in the present case to be the area or volume extent of the load, in particular a load contour. For example, long loads, such as profiles or beams, regularly lead to a movement behavior of the industrial truck which is completely different from that in the case of short, compact loads. This embodiment therefore provides that the geometry of the loaded load can, for example, be detected automatically or by a manual input, and that a steering line shift can, for example, be carried out in a manner dependent on this parameter. The steering pole of the industrial truck can, for example, be arranged in a geometric center of the load in the case of particularly long loads with the result that the industrial truck can be rotated and maneuvered in a smallest possible circle together with the long load. By taking into account the center of gravity of the loaded load, it is taken into account that it makes sense to orient the steering line at the center of gravity of the load, especially in the case of heavy loads. If this is the case, far fewer problems with the inertia of the load exist when initiating a turning maneuver and traveling around a turn. It goes without saying that a combination of the consideration of the geometry and of the center of gravity of the loaded load is also possible. The steering pole here need not necessarily lie in the geometric center point or the center of gravity of the load or of the entire vehicle together with the load, but can rather also be arranged somewhere therebetween, in particular in the case of unbalanced loads.

In an embodiment, the present invention provides that the operating parameter can, for example, comprise a tilt angle of the industrial truck. The tilt angle can, for example, be a tilt angle about a front axis of the industrial truck. A front axis (also called a front wheel axis) within the meaning of the present invention intersects the at least two front wheels in their respective centers. This can advantageously take into account a particularly high weight of a loaded load. It is, however, also conceivable that the tilt angle is a tilt angle about the transverse axis of the industrial truck. This enables the shift of the steering line during upward or downward travel in longitudinal travel operation to be taken into account in an advantageous manner. It is also conceivable that the tilt angle is a tilt angle about the longitudinal axis of the industrial truck. This enables the shift of the steering line during upward or downward travel in transverse travel operation to be taken into account in an advantageous manner. It is conceivable that the industrial truck has a position sensor to take the tilt angle into account.

In an embodiment, the present invention provides that the operating parameter can, for example, comprise an intensity, in particular a speed, of the operation of the steering angle transmitter of the industrial truck, wherein the operating parameter is in particular detectable via a magnetic detection device, such as a Hall sensor. It can, for example, be provided that, in the case of a relatively fast rotation of the steering wheel, the steering line is shifted toward the center of the industrial truck, and, in the case of a relatively slow rotation of the steering wheel, the steering line is shifted away from the center of the industrial truck. This can result in advantageous characteristics, in particular in terms of driving dynamics.

In an embodiment, the present invention provides that the operating parameter can, for example, comprise an input speed, at which the input value is entered at the steering angle transmitter. An input speed within the meaning of the present invention is the change of the input value at the steering angle transmitter per unit time. For example, if the steering angle transmitter is a steering wheel, the steering ratio depends on the speed at which the steering wheel is turned. It can, for example, be provided that the steering ratio is controlled so that the steering ratio is lower at low input speeds than at high input speeds. This allows the operator a comfortable and intuitive way of setting the steering ratio. It is conceivable that the steering ratio is adjusted in a linear manner with the input speed. It is also conceivable, however, that the steering ratio is adjusted in a stepped manner with the input speed.

In an embodiment, the present invention provides that the operating parameter can, for example, comprise a turning space available around the industrial truck. A turning space within the meaning of the present invention is that space around the industrial truck which is available to the industrial truck for turning. It can, for example, be provided that the available turning space is detected by environmental sensors. Environmental sensors can, for example, be radar, lidar, ultrasonic, laser or optical sensors. This makes it possible to adapt the steering ratio to external circumstances in an advantageous manner. It is in particular provided that the steering ratio is lower in the case of a relatively large-area possible turning space than in the case of a relatively small possible turning space. This means that it is possible to travel comfortably on wide paths as well as to turn easily, for example, in narrow rack aisles.

In an embodiment, the present invention provides that the industrial truck can, for example, comprise a loading apparatus, in particular a fork, which is provided to receive a load to be transported. The loading apparatus is raised to a lifting height. It is thereby provided that the operating parameter comprises the lifting height. It is in particular provided that the steering ratio is controlled so that the steering ratio is lower at a relatively low lifting height than at a relatively high lifting height. This makes it possible in an advantageous manner to simply set a greater steering ratio for loading or unloading the load to be transported in racks than, for example, in the case of a transport trip which follows loading or unloading. This greatly facilitates the operation of the industrial truck. It is conceivable that the steering ratio is adjusted in a linear manner with the lifting height. It is also, however, conceivable that the steering ratio is adjusted in a stepped manner with the lifting height.

The present invention further provides that the operating parameter can, for example, comprise a manual selection. In other words, the operator can adjust the steering ratio to their personal preferences while the industrial truck is in operation. It is conceivable that this can be performed via a quick adjustment. It is, for example, conceivable that the steering ratio can be set on a controller in a stepped or infinitely variable manner.

The present invention also provides an industrial truck which has a steering device which is configured to carry out the steering method according to the present invention via a control of the steering ratio. The steering device of the industrial truck according to the present invention here brings about the control of the steering ratio. The steering device can comprise the steering angle transmitter, electrical components, hydraulic components, and/or microcomputers.

All the advantages, features and details of the steering method according to the present invention mentioned herein also refer to the industrial truck according to the present invention.

Further details, features and advantages of the present invention result from the drawings and from the following description of embodiments on the basis of the drawings. The drawings thereby illustrate merely exemplary embodiments of the present invention which do not in any way restrict the concept of the present invention.

Figure 2:
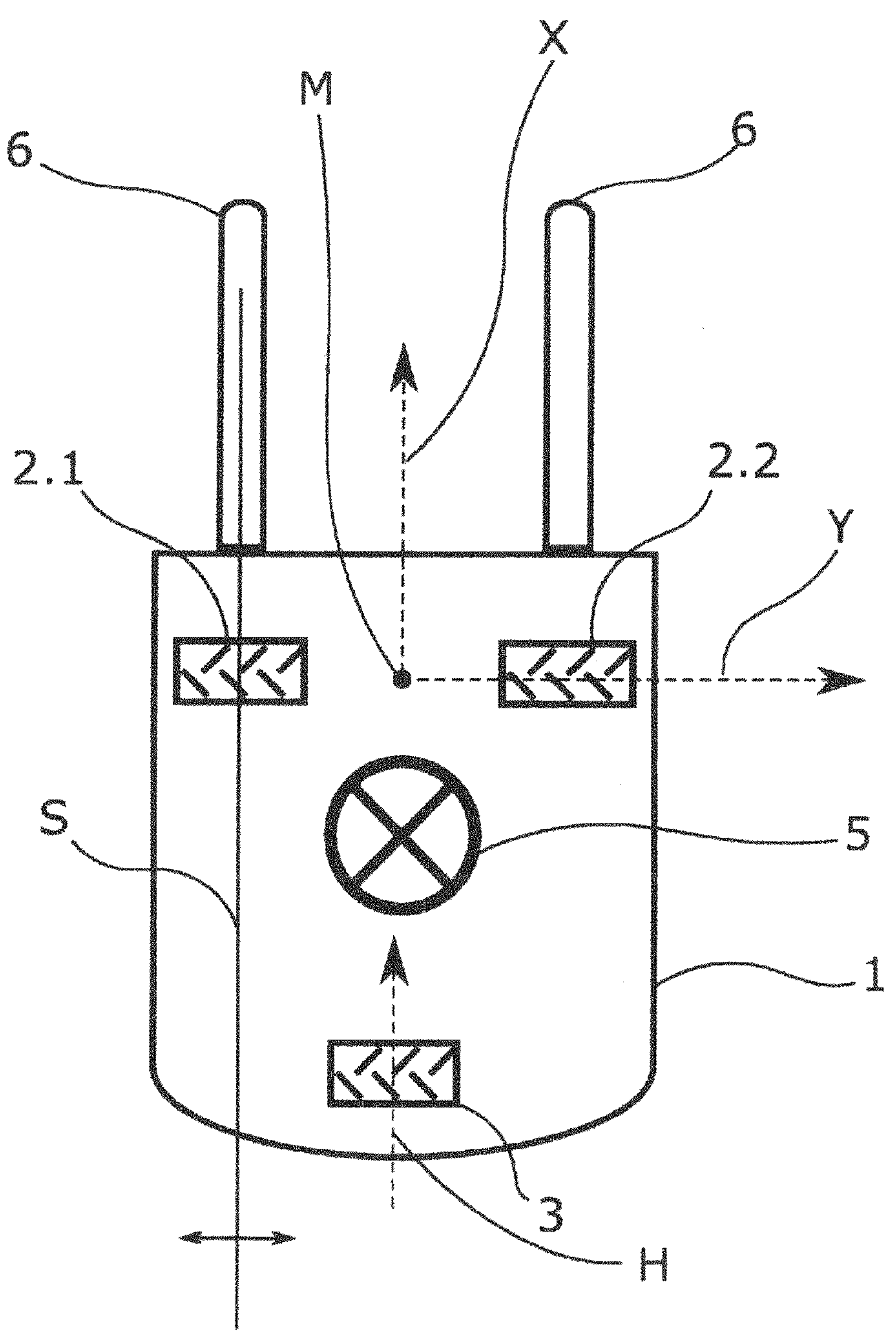
FIG. 2 shows a schematic view of the industrial truck shown in FIG. 1 during travel straight ahead in a transverse travel operation.
Figure 3:
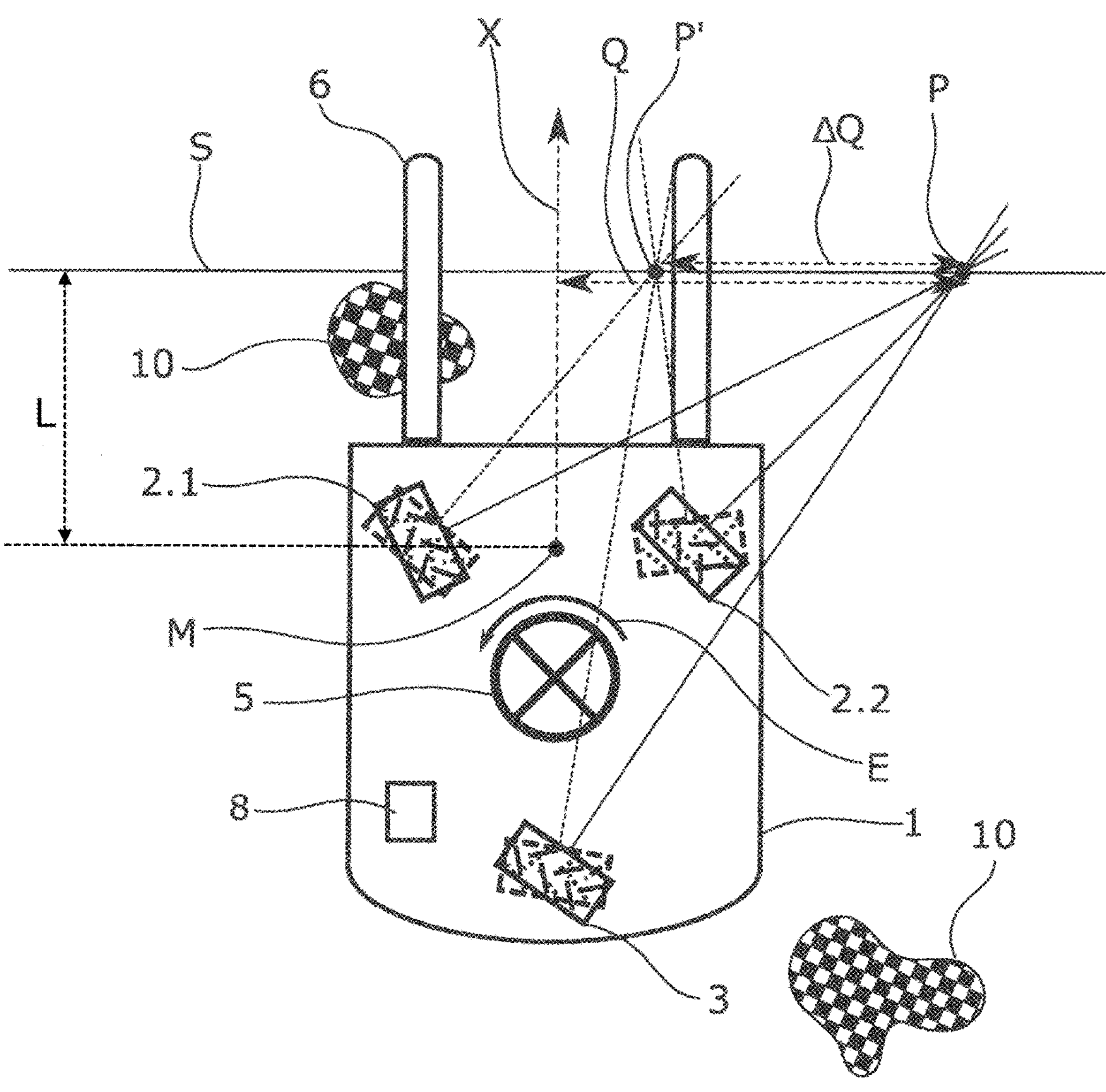
FIG. 3 shows a schematic view of the industrial truck shown in FIG. 1 during a turning maneuver in a longitudinal travel operation.
Figure 4:
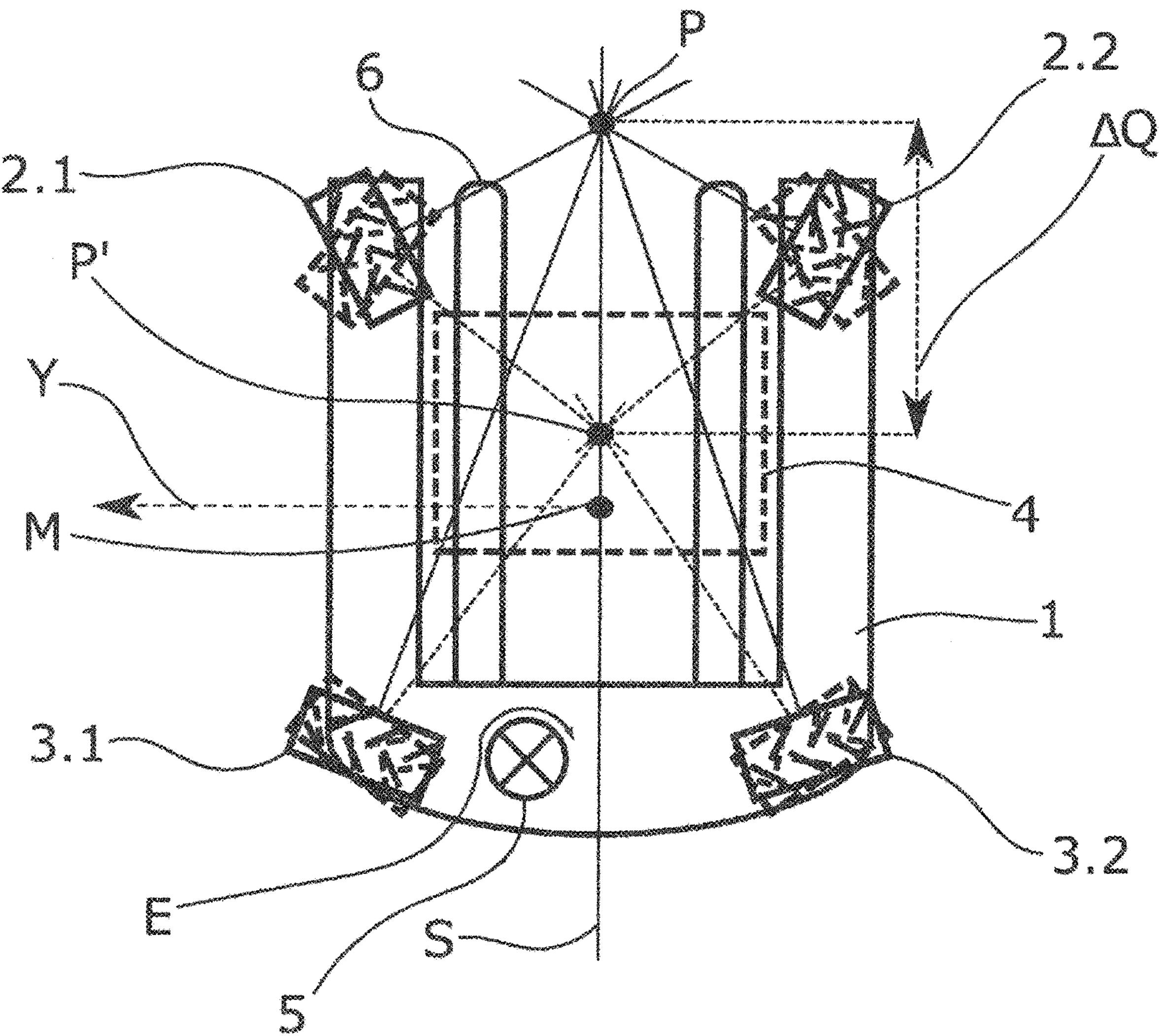
FIG. 4 shows a schematic view of an industrial truck according to a further exemplary embodiment of the present invention during a turning maneuver in a transverse travel operation.
Figure 5:
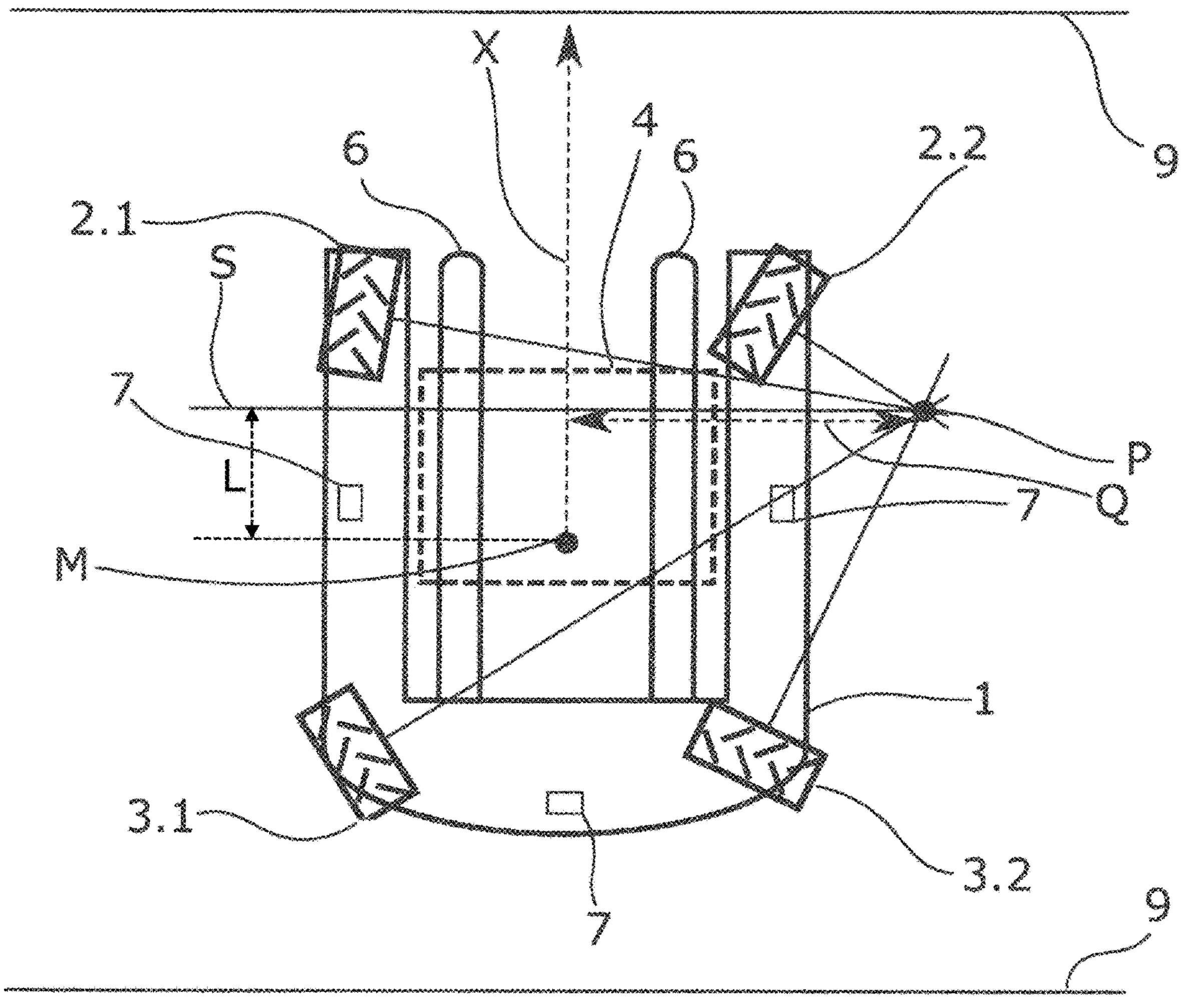
FIG. 5 shows a schematic view of an industrial truck according to a further exemplary embodiment of the present invention during a turning maneuver in a longitudinal travel operation.

FIGS. 1 to 5 each show industrial trucks 1 according to exemplary embodiments of the present invention. The industrial trucks 1 shown have a left-hand front wheel 2.1 and a right-hand front wheel 2.2 as well as a rear wheel 3 (FIGS. 1 to 3) or a left-hand rear wheel 3.1 and a right-hand rear wheel 3.2 (FIGS. 4 and 5). The industrial trucks 1 also each have a steering angle transmitter 5, for example, in the form of a steering wheel. For the sake of clarity, the steering angle transmitter 5 is not reproduced in each of the drawings shown here. The industrial trucks 1 also have steering devices (which are not shown) which are configured for carrying out the steering method according to the present invention.

FIG. 1 shows the industrial truck 1 during travel straight ahead in a longitudinal travel operation. The front wheels 2.1, 2.2 and the rear wheel 3 are oriented parallel to a longitudinal axis X of the industrial truck 1. The longitudinal axis X lies orthogonally with respect to a transverse axis Y of the industrial truck 1 and intersects the transverse axis Y in the vehicle center M.

FIG. 2 shows the industrial truck 1 shown in FIG. 1 during travel straight ahead in a transverse travel operation. The front wheels 2.1, 2.2 and the rear wheel 3 are oriented parallel to the transverse axis Y of the industrial truck 1.

FIGS. 3 to 5 show the industrial trucks 1 during a turning maneuver. The turning maneuvers are each carried out about a steering pole P. The steering pole P is the intersection point of straight lines which lie orthogonally on the center points of all wheels 2.1, 2.2, 3, 3.1, 3.2 of the respective industrial truck 1. The turning radius is here the spacing between the steering pole P and the vehicle center M. The steering pole P lies at infinity during travel straight ahead.

FIGS. 3 and 4 show how the steering angle transmitter 5 is actuated during a turning maneuver. The steering angle transmitter 5 is here designed as a steering wheel. By turning the steering wheel, the operator of the industrial truck 1 enters an input value E (shown here by the arrows above the steering angle transmitter 5). In the shown exemplary embodiment, the input value E is an angle via which the steering wheel is rotated. When the input value E is entered, the steering pole P shifts along the steering line S by a steering travel $\Delta Q$. The steering pole P, shifted by the steering travel $\Delta Q$, is here designated as P'. The input value E is linked to the steering travel $\Delta Q$ via a steering ratio. A multiplication of the input value E by the steering ratio results in the steering travel $\Delta Q$.

The present invention provides that the steering ratio is dynamically controlled. This means that the steering ratio is adapted during operation of the industrial truck 1. In the industrial trucks 1 shown here, the steering ratio is controlled in a manner dependent on an operating parameter of the industrial truck 1. The operating parameter can, for example, comprise a vehicle speed. The operating parameter in longitudinal travel operation of the industrial truck 1 can also comprise a transverse spacing Q of the steering pole P from the longitudinal axis X, and, in transverse travel operation of the industrial truck 1, can comprise a longitudinal spacing L of the steering pole P from the transverse axis Y. The operating parameter can also comprise an input speed at which the input value E is entered and/or manually set at the steering angle transmitter 5.

The industrial truck 1 shown in FIG. 3 has a vibration sensor 8. The vibration sensor 8 detects flatness deviations 10 of the track on which the industrial truck 1 is traveling. The measured flatness deviations 10 also flow into the operating parameter which has an influence on the steering ratio.

FIGS. 4 and 5 illustrate a load 4 which is conveyed by the industrial truck 1. The load 4 is here received via a loading device 6, i.e., by a fork in the shown exemplary embodiments. The loading device 6 is here raised to a lifting height. In the shown exemplary embodiments in these drawings, the operating parameter also comprises the lifting height, with the result that the lifting height flows into the control of the steering ratio.

FIG. 5 shows an industrial truck 1 which has environmental sensors 7. The available turning space which is limited here by rack walls 9 is detected by the environmental sensors 7. The operating parameter comprises the available turning space in the exemplary embodiment shown in FIG. 5. The steering ratio is therefore here controlled in a manner dependent on the available turning space.

The details and features shown here for longitudinal travel operation also apply mutatis mutandis to transverse travel operation, and vice versa.

The present invention is not limited to embodiments described herein; reference should be had to the appended claims.

LIST OF REFERENCE CHARACTERS

1 Industrial truck
2.1 Left-hand front wheel
2.2 Right-hand front wheel
3 Rear wheel
3.1 Left-hand rear wheel
3.2 Right-hand rear wheel
4 Load
5 Steering angle transmitter 6 Loading apparatus
7 Environmental sensors
8 Vibration sensor
9 Rack wall
10 Flatness deviations
E Input value
L Longitudinal spacing
M Vehicle center
P, P' Steering pole
Q Transverse spacing
ΔQ Steering travel
S Steering line
X Longitudinal axis
Y Transverse axis

What is claimed is:

1. A steering method for operating an industrial truck, wherein the industrial truck comprises:

at least two front wheels;

at least one rear wheel; and a steering angle transmitter which is configured to initiate a turning maneuver about a steering pole, the method comprising:

entering an input value at the steering angle transmitter; and steering at least one of the at least two front wheels and the at least one rear wheel, wherein, the steering pole is moved on a steering line by a steering travel, the input value is linked to the steering travel via a steering ratio, and the steering ratio is controlled.

2. The steering method as recited in claim 1, wherein the control of the steering ratio is a dynamic control.

3. The steering method as recited in claim 1, wherein the steering ratio is controlled in a manner which is dependent on an operating parameter of the industrial truck.

4. The steering method as recited in claim 3, wherein, the operating parameter comprises a vehicle speed, and the steering ratio is controlled so that the steering ratio is higher at a lower vehicle speed, and the steering ratio is lower at a higher vehicle speed.

5. The steering method as recited in claim 3, wherein, the industrial truck is configured to be operated in at least one of a longitudinal travel operation and in a transverse travel operation, in the longitudinal travel operation, a travel straight ahead of the industrial truck is arranged along a longitudinal axis of the industrial truck, in the transverse travel operation, the travel straight ahead of the industrial truck is arranged along a transverse axis of the industrial truck, the longitudinal axis and the transverse axis are arranged orthogonally with respect to each other and intersect in a vehicle center, in the longitudinal travel operation, the operating parameter comprises a transverse spacing of the steering pole from the longitudinal axis, and in the transverse travel operation, the operating parameter comprises a longitudinal spacing of the steering pole from the transverse axis.

6. The steering method as recited in claim 5, wherein the control of the steering ratio is provided so that the steering ratio in the longitudinal travel operation is higher at a smaller transverse spacing than at a larger transverse spacing, and the steering ratio in the transverse travel operation is higher at a smaller longitudinal spacing than at a larger longitudinal spacing.

7. The steering method as recited in claim 3, wherein the operating parameter comprises a state of a track on which the industrial truck is moved.

8. The steering method as recited in claim 7, wherein, the state of the track on which the industrial truck is moved comprises flatness deviations of the track, and the steering ratio is controlled so that when at least one of a pronounced flatness deviation of the track and a higher number of the flatness deviations of the track exist(s), the steering ratio is lower than when at least one of a less pronounced flatness deviation of the track and a lower number of flatness deviations of the track exist(s).

9. The steering method as recited claim 3, wherein the operating parameter comprises at least one of a geometry of a loaded load and a center of gravity of the loaded load.

10. The steering method as recited in claim 3, wherein the operating parameter comprises a tilt angle of the industrial truck.

11. The steering method as recited in claim 3, wherein, the industrial truck further comprises a magnetic detection device, the operating parameter comprises an intensity of an operation of the steering angle transmitter of the industrial truck, and the operating parameter is detectable via the magnetic detection device.

12. The steering method as recited in claim 11, wherein, the intensity of the operation of the steering angle transmitter of the industrial truck is a speed, and the magnetic detection device is a Hall sensor.

13. The steering method as recited in claim 3, wherein the operating parameter comprises an input speed at which the input value is entered at the steering angle transmitter.

14. The steering method as recited in claim 13, the steering ratio is controlled so that the steering ratio is lower at a lower input speed than at a higher input speed.

15. The steering method as recited in claim 3, wherein the operating parameter comprises a turning space which is available around the industrial truck.

16. The steering method as recited in claim 15, wherein, the industrial truck further comprises at least one environmental sensor, the turning space which is available is detected via the at least one environmental sensor, and the steering ratio is controlled so that the steering ratio is lower when there is more of the turning space available than when there is less of the turning space available.

17. The steering method as recited in claim 3, wherein, the industrial truck further comprises a loading apparatus which is configured to receive a load to be transported, the method further comprises:

lifting the loading apparatus to a lifting height, and the operating parameter comprises the lifting height.

18. The steering method as recited in claim 17, wherein, the loading apparatus is a fork, and the steering ratio is controlled so that the steering ratio of a lower lifting height is lower than that of a higher lifting height.

19. The steering method as recited in claim 3, wherein the operating parameter comprises a manual selection.

20. An industrial truck comprising:

a steering device which is configured to perform the steering method as recited in claim 1 via a control of the steering ratio.

* * * * *